Patented May 7, 1935

2,000,053

UNITED STATES PATENT OFFICE 2,000,053

PROCESS FOR THE PRODUCTION OF CARBOXYLIC ACID

Walter Elwood Vail, Wilmington, Del., assignor to E. I. du Pont de Nemours & Company, Wilmington, Del., a corporation of Delaware No Drawing. Application August 24, 1931, Serial No. 559,132

7 Claims. (Cl. 260—116)

This invention relates to the synthesis of organic compounds and particularly to the preparation of higher aliphatic acids by the interaction of olefines, carbon monoxide, and steam.

Aliphatic acids of the higher order such as propionic acid, butyric acids, etc., have been heretofore prepared by various methods. For example, propionic acid has been obtained by the reduction of acrylic or lactic acid; by suitable Schizomycetes fermentation of the lactate or malate of calcium; or by the oxidation of propyl alcohol with dichromate solution. Such methods of preparation are necessarily expensive due principally to the relatively high cost of the raw materials. Owing to the many important uses to which acids of this type are adaptable, many of which uses have not been exploited extensively due to their present high cost, it is obvious that a process for their preparation from inexpensive materials, which are available and which will be even more readily available in the near future, will be of far reaching importance in this art.

In the copending application of G. B. Carpenter Serial No. 559,130, a process is described for the preparation of aliphatic carboxylic acids of the higher order by the reaction of steam, carbon monoxide, and an olefinic hydrocarbon, i. e. an aliphatic hydrocarbon containing a double bond,—for example, the olefines ethylene, propylene, butylene, etc.,—the synthesis producing from these olefines propionic, butyric, and valeric acids respectively. The acid produced contains one more carbon atom than the unsaturated hydrocarbon treated.

An object of the present invention is to provide a process for the preparation of aliphatic carboxylic acids from steam, carbon monoxide, and olefinic hydrocarbons. A further object of this invention is to provide a process for the preparation of monocarboxylic acids from steam, carbon monoxide and an olefine in the presence of a catalyst. Another object of the invention is to provide a process for the preparation of acids having the structural formula $RCH_2COOH$ from steam, carbon monoxide, and an olefinic hydrocarbon, the R indicating a substituted or unsubstituted alkyl or aralkyl grouping. Other objects and advantages will hereinafter appear.

According to the present invention aliphatic carboxylic acids can be prepared from carbon monoxide, steam, and an olefinic hydrocarbon by passing a gaseous mixture of these materials over a salt of an aliphatic carboxylic acid or a compound of a metal which is capable of forming with an aliphatic carboxylic acid a salt of that acid and more particularly a propionic acid salt under the conditions of operation. Substances which exhibit this characteristic include, for example, the carbonates, oxalates, methylates, ethylates, propylates, acetates, propionates, hydroxides, etc., and like compounds of the alkaline earth metals and alkali metals, as well as similar salts of zinc, magnesium, etc. Mixtures of two or more of these compounds may be used. I prefer to employ these catalysts supported on activated charcoal, fuller's earth, pumice and like catalyst supports, but they may be employed unsupported if desired.

Raw materials suitable for use in the process are readily available from a number of sources. Thus ethylene and various homologues thereof are found in the gases evolved in cracking petroleum and may be separated therefrom, for example, by fractional liquefaction. It is preferable, for the sake of avoiding undesirable by-products, that the hydrocarbon which it is desired to convert be employed in a relatively high degree of purity.

The carbon monoxide required for the synthesis may conveniently be derived from various commercial sources, such as, for example, water-gas, producer gas, etc., by liquefaction or other methods, and should likewise for the best results be relatively pure.

Inert gases, such as nitrogen, may be included with the reactants, this being advantageous in some cases from the standpoint of controlling the temperature of the exothermic reaction and of limiting the extent thereof, where it may be desired to restrict the overall conversion of the reactants for the sake of enhancing the relative yield of the desired acids.

The relative proportions of the reactants can be varied although it has been found that very advantageous results are obtained when the steam and carbon monoxide are in excess with respect to the olefinic hydrocarbon. Concentrations of the latter within the range of from 1½ to 5% by volume of the total reactants have been employed with good results.

The use of pressures in excess of atmospheric, say from 25 to 900 atmospheres, is preferred. The reaction proceeds over a wide range of temperatures although the optimum temperature varies with specific cases, depending inter alia upon the hydrocarbon being used. Generally the desired reaction can be obtained at from 200° C. to 500° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 275° C. to 375° C.

The following example will illustrate one method of practicing the invention, although the invention is not limited to the example.

*Example.*—A gaseous mixture containing by volume 95 parts of carbon monoxide 5 parts of ethylene and 20 parts of steam was passed over a sodium carbonate catalyst supported on charcoal. The catalyst was prepared by impregnating charcoal with a sodium acetate solution of sufficiently high concentration to give, upon drying, a charcoal containing approximately 20% sodium acetate. The pressure was maintained at approximately 700 atmospheres and the temperature at approximately 300° C. A good yield of aliphatic carboxylic acids containing propionic acid was obtained.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with copper or silver or using for the construction of this equipment acid-resisting alloys of, for example, molybdenum, cobalt, tungsten, copper, manganese, or nickel.

Various changes may be made in the method hereinbefore described without departing from the invention or sacrificing the advantages thereof.

I claim:

1. In a process of reacting a gaseous mixture containing an olefinic hydrocarbon, steam, and carbon monoxide, and thereby producing aliphatic carboxylic acid, the step of passing the gaseous mixture over a metal compound that forms a salt with the said carboxylic acid.

2. In a process of reacting a gaseous mixture containing an olefine, steam, and carbon monoxide, and thereby producing aliphatic carboxylic acid, the step of passing the gaseous mixture over a metal compound that forms a salt with the said carboxylic acid.

3. In a process of reacting a gaseous mixture containing ethylene, steam, and carbon monoxide, and thereby producing propionic acid, the step of passing a gaseous mixture over a metal compound that forms a salt with the said carboxylic acid.

4. In a process of reacting a gaseous mixture containing an olefinic hydrocarbon, steam, and carbon monoxide, and thereby producing aliphatic carboxylic acid, the step of passing the gaseous mixture over the salt of an aliphatic carboxylic acid as a catalyst for the reaction.

5. In a process of reacting a gaseous mixture containing ethylene, steam, and carbon monoxide, and thereby producing aliphatic carboxylic acid, the step of passing the gaseous mixture over a salt of an aliphatic carboxylic acid as a catalyst for the reaction.

6. In a process of reacting a gaseous mixture containing an olefine, steam, and carbon monoxide and thereby producing aliphatic carboxylic acid, the step of passing the gaseous mixture over the salt of an aliphatic carboxylic acid supported on activated charcoal as a catalyst for the reaction.

7. In a process of reacting a gaseous mixture containing ethylene, steam and carbon monoxide and thereby producing propionic acid, the step of passing the gaseous mixture over potassium carbonate.

WALTER ELWOOD VAIL.